April 28, 1936.  L. J. MOLLET  2,038,901
LOCKING DEVICE FOR LIDS, BOX AND TRUNK PANELS AND THE LIKE
Filed Dec. 9, 1933
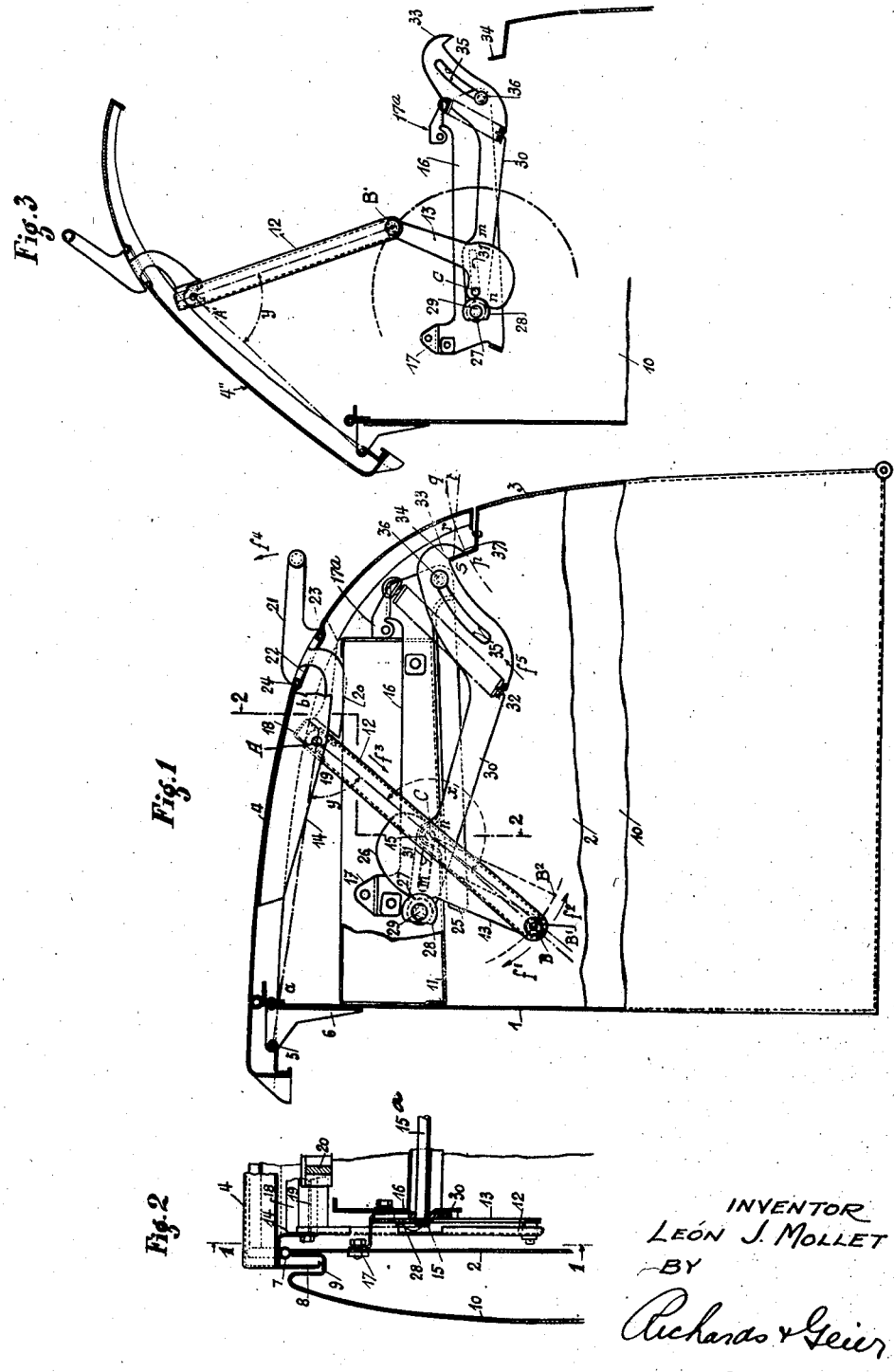
INVENTOR
LEÓN J. MOLLET
BY
Richards & Geier
ATTORNEYS Patented Apr. 28, 1936

2,038,901

UNITED STATES PATENT OFFICE 2,038,901

LOCKING DEVICE FOR LIDS, BOX AND TRUNK PANELS, AND THE LIKE

Léon Julien Mollet, Asnieres, France, assignor to "Société Anonyme des Usines Chausson", Asnieres, France Application December 9, 1933, Serial No. 701,579
In France December 9, 1932

3 Claims. (Cl. 292—3)

This invention relates to a locking device for lids, flaps and swinging box and trunk panels, such as those of the rear trunk of motor vehicles.

Said device is characterized particularly in that the flap, lid or panel is connected to a stationary axis by means of a connecting rod (provided with an operating handle extending freely through the lid) and of a crank connected together, the axes of articulation of the connecting rod upon the flap, lid or panel, of the connecting rod and of the crank upon the stationary axis being placed in such a manner that in the closed position the crank has moved beyond a dead center and bears against a stationary abutment, thus insuring the locking of the flap, lid or panel in the closed position.

Another feature of my invention consists in that the crank constitutes a cam against which a roller or any other suitable element comes to bear under the action of a return spring device thus insuring the balance of the flap, panel or lid.

When the trunk is provided with a swinging lid and a swinging panel, the connecting rod is fixed upon the lid and the roller or other device which engages the cam is formed integrally with a locking hook on the swinging panel.

This invention also relates to the boxes and trunks provided with the aforesaid device.

In the accompanying drawing which illustrates, by way of example only, a device according to the present invention;

Fig. 1 is a vertical longitudinal section taken on line 1—1 in Fig. 2 of the rear trunk of a motor vehicle provided with a device constructed according to the present invention, said device being shown in the closed position.

Fig. 2 is a vertical transverse sectional view taken on line 2—2 in Fig. 1.

Fig. 3 is a similar sectional view, drawn on a smaller scale, which shows the various elements in the position of maximum opening.

The rear trunk for motor vehicle as illustrated in the annexed drawing is constituted, in a well known manner by a front panel 1, two side panels limited at the top by a curvilinear profile $abc$ (Fig. 1), a bottom part not shown, a back panel 3 which may be mounted so as to be capable of a swinging movement, and a lid 4 hinged upon an axis 5 carried by metal parts 6 fixed upon the front panel 1. Laterally the lid 4 comprises a flange 8 engaging a channel 9 formed between the trunk panel 2 and an outer sheet metal plate 10. When shut down, the lid comes to rest for example upon joints 7, as shown in Fig. 2, made of rubber or any suitable material.

According to my invention and in the mode of execution shown by way of example the lid 4 is connected to the panel 2 on both sides of the trunk by means of a connecting rod 12 and of a crank 13. The connecting rod 12 is pivoted at A upon a metal fitting 14 fixed upon the inner side of the lid 4; its other end is pivoted at B upon the crank 13 which in its turn is pivotally mounted upon the fixed axis C constituted by a trunnion 15 carried by a metal fitting 16 secured at 17 and 17a upon panel 2.

The trunnions 15 which are placed on both sides of the trunk are preferably formed at the ends of a common axis 15a (Fig. 2) constituting a tie member and extending under the bottom of the tool box 11.

The two connecting rods 12 are also connected together by a very rigid tie bar consisting for example of two U-shaped iron bars 18, 19 suitably assembled. The support 20 of a handle 21 is fixed upon said bars 18—19 in the plane of symmetry of the trunk. Since the handle 21 is fixed upon the bars 18—19 which rigidly interconnect the rods 12 pivoted at A (Fig. 1), said handle rotates along with the bars 18—19 and the rods 12 around the point A. Said support 20 extends freely through an elongated slot 22 provided in the lid 4. A joint 23 of rubber or any other suitable material arranged in a recess 24 in the lid forms a rest for the handle 21 when in its closed position.

The shape and length of the connecting rod 12 and of the crank 13, the positions of the axes A and C upon the lid 4 and upon the metal fitting 16 are devised in such a manner that in the closed position which has been shown, the angle $x$ formed by the lines C A and C B is larger than 180°. In this position the crank 13 comes to rest against a fixed abutment 25 (Fig. 1) provided upon part 16.

Consequently the opening of the lid 4 by a direct force exerted upwards upon said lid will not be possible. In fact the crank 13 cannot swing in the direction of the arrow because it is stopped by the abutment 25. Rotation in the direction of the arrow $f^2$ is also prevented as the crank 13 having moved beyond the dead center $B^1$, any attempt to raise the lid 4 would result in a downward pull of the connecting rod 12 upon said lid 4 in the direction of the arrow $f^3$.

When it is desired to raise the lid, the connecting rod 12 on each side must be swung around the axis A in the direction indicated by the arrow $f^4$ (Fig. 1) by operating the handle 21 so that the axis of articulation B comes to a point $B^2$ located on the right of the dead center $B^1$. From that moment the lid 4 may be raised higher either by operating the handle 21 or by acting upon the lid itself. The crank 13 swings around the axis C in the direction of the arrow $f^2$, the axis B describes an arc of a circle B $B^1$ $B^2$ around C and the connecting rod 12 connecting at every moment a point $B^1$ (Fig. 3) of said circle to the axis A, determines for every one of said points a position A' of said axis A and consequently a position of opening of the lid 4.

As the opening proceeds, the angle $y$ increases and then decreases so that the opening movement is interrupted when said angle has again come to its first value, the handle 21 abutting now again upon the lid 4 (this being aproximately the position shown in Fig. 3).

The mechanism will preferably be completed by a balancing device for the lid 4.

In the mode of execution shown in the drawing, one end of the crank 13 has the form of a cam 26 having a radius which decreases from $m$ to $n$ (Figs. 1 and 3), said radius being constant and minimum when the length $n$ is reached. A roller 27 guided by a guide 28 bears against said cam 26. The guide 28 and the roller axis 27 are supported upon a metal part 30, which is provided with an opening 31 through which the axis 15a extends. The length of said opening 31 is sufficient to allow the roller 27 to move a distance equal to the difference between the maximum and the minimum radii of cam 26. The part 30 is returned in the direction of the arrow $f^5$ (Fig. 2) by a spring 32 fixed upon said part 30 and upon the supporting part 16.

It will be seen that for every particular position of the cam 26 corresponds a certain position of the roller 27 and of the part 30 and consequently a certain particular tension of the spring 32. This tension is a maximum when the cam 26 presents its point $m$ of largest radius to the roller 27 (lid 4 brought down upon the trunk) and minimum when the cam 26 presents its point $n$ of smallest radius to the roller (raised lid, Fig. 3). The feature that in the raised position of the lid 4 the smallest radius $n$ of the cam 26 is in contact with the roller 27, is particularly advantageous since the force necessary for maintaining the lid 4 in its raised position increases when the lid approaches its closed position.

The spring 32 and the cam 26 may be devised so as to allow a perfect balance of the lid 4 in all its positions.

The part 30 which moves in a substantially horizontal direction may be utilized for locking the rear panel 3 in its closed position. In that case the part 30 ends in a hook 33. Considering that said hook 33 must be able to free the upper edge 34 of panel 3 when the lid is partly open, the part 30 is formed with an inclined cam groove 35 through which extends a fixed axis 36 carried upon part 16. Said groove 35 has a shape and a direction such that when the part 30 is returned to the right by the spring 32 the end 37 of hook 33 describes an ascending trajectory $p$ $q$ (Fig. 1) which passes at $r$ through the circular trajectory $s$ $t$ described by the upper edge 34 of the panel 3. Consequently when the part 30 has moved back the rear panel 3 is set free.

When closing the trunk the panel 3 is first raised before bringing down the lid 4. At the end of the stroke the hook 33 locks the panel 3.

As will be seen, the above described device is of very simple construction and its operation is perfect. On the other hand the trunk being provided on both sides with part 16 and its co-operative elements its closing is insured whatever the distortions may be.

While I have shown and described the preferred form of my device, it will be understood that various modifications in the details of construction may be made without departing from the spirit and scope of the invention as defined in the claims.

What I claim and desire to secure by Letters Patent of the United States is:

1. A locking device for the hinged lid of a box, a trunk or the like having also a swinging panel, said device comprising a connecting rod, an axis carried by said lid, one end of said connecting rod being connected with said axis, a handle rigidly connected to said connecting rod and extending through the lid to move said connecting rod, a crank pivotally connected at one end with the connecting rod at the other end of the latter, a fixed axis carried by the trunk, said crank being pivotally connected at its other end upon the second-mentioned axis, and means in combination with the crank for balancing the lid, and means automatically actuated by said balancing means for locking the swinging panel in its closed position.

2. A locking device for a lid hinged upon a box, trunk or the like which comprises a connecting rod, an axis carried by said lid, one end of said connecting rod being connected with said axis, a handle rigidly connected to said connecting rod and extending through the lid to move said connecting rod, a crank pivotally connected at one end with the connecting rod at the other end of the latter, a fixed axis carried by the trunk, said crank being pivotally connected at its other end upon the second-mentioned axis, the pivotal axes of the connecting rod upon the lid, of the connecting rod and of the crank, as well as the fixed pivotal axis of the crank upon the trunk being so arranged that in the closed position of said lid, the crank has moved beyond the dead center point located upon the line which passes through the pivotal axis of the connecting rod and of the lid and through the fixed pivotal point of the crank upon the trunk, a cam formed integrally with the crank, a movable part guided upon the fixed pivotal axis of the crank, a roller carried upon said part, and a spring exerting a pull upon said part in order to always keep said roller in engagement with the crank cam.

3. A locking device for the hinged lid of a box, trunk or the like provided also with a swinging panel, said device comprising: a connecting rod, an axis carried by said lid, one end of said connecting rod being connected with said axis, a handle rigidly connected to said connecting rod and extending through the lid to rotate said connecting rod, a crank pivotally connected at one end with the connecting rod at the other end of the latter, a fixed axis carried by the trunk, said crank being pivotally connected at its other end upon the second-mentioned axis, a cam formed integrally with the crank, a movable part guided upon the fixed pivotal axis of the crank, a roller carried upon said part, a spring exerting a pull upon said part in order to always keep said roller in engagement with the crank cam, said cam being so constructed that it presents its point of minimum radius corresponding to the minimum tension of the spring to the roller when the lid is open in full, and its point of maximum radius corresponding to the highest tension of the spring when the lid is closed, a second axis fixed upon the trunk, a roller supporting part provided with a second groove and guided upon said axis, and a hook at the end of said part opposite the roller, said hook being hooked upon the swinging panel in the closed position of the latter and of the lid, said second groove being so shaped that said hook moves beyond the trajectory of the swinging panel at the end of a short opening stroke of the lid.

LÉON JULIEN MOLLET.